JOHN S. NOLEN.
Improvement in Cultivators.
No. 119,639.                                Patented Oct. 3, 1871.
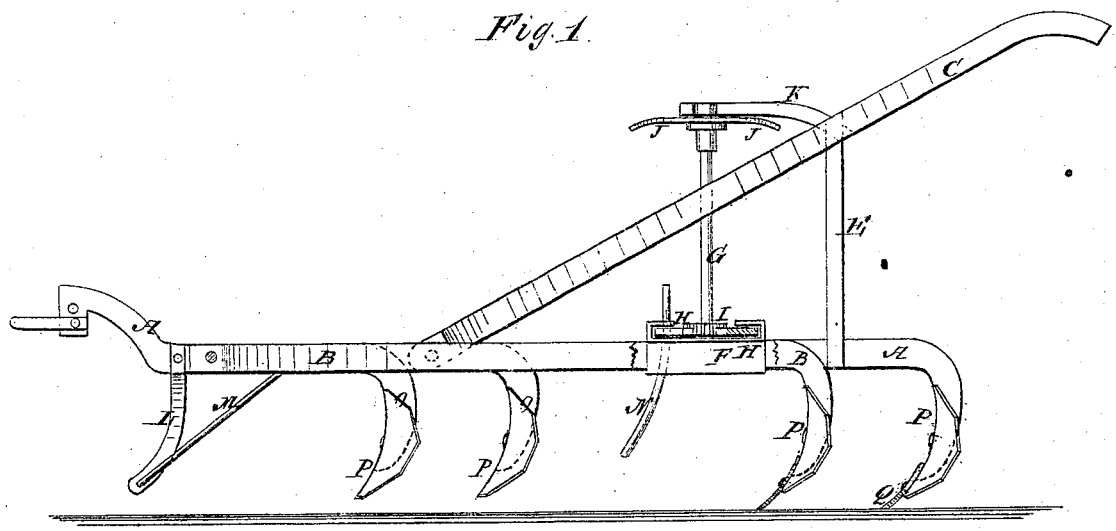
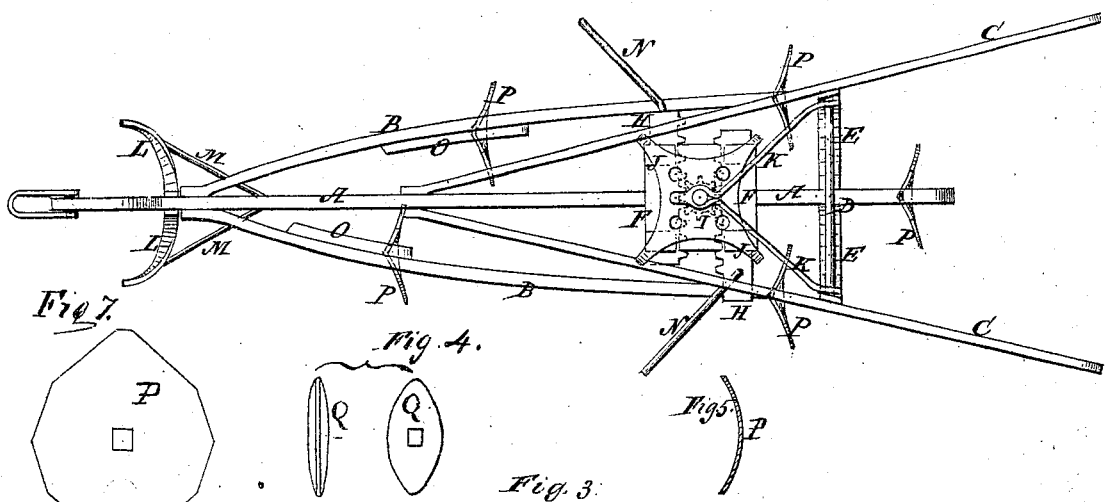

UNITED STATES PATENT OFFICE.

JOHN S. NOLEN, OF PAULSBOROUGH, NEW JERSEY.

IMPROVEMENT IN CULTIVATORS.

Specification forming part of Letters Patent No. 119,639, dated October 3, 1871.

*To all whom it may concern:*

Be it known that I, JOHN S. NOLEN, of Paulsborough, in the county of Gloucester and State of New Jersey, have invented a new and useful Improvement in Cultivator; and I do hereby declare that the following is a full, clear, and exact description thereof, which will enable others skilled in the art to make and use the same, reference being had to the accompanying drawing forming part of this specification.

Figure 1 is a side view of my improved cultivator, part being broken away to show the construction. Fig. 2 is a top view of the same. Fig. 3 is a side perspective view of one of the shovels and its point as attached to its standard. Fig. 4 is a front and side view of one of the shovels. Fig. 5 is a detail section of the same taken through the line $x\ x$, Fig. 4. Fig. 6 is a detail section of the same taken through the line $y\ y$, Fig. 4. Fig. 7 is a front or face view of one of the shovels.

My invention relates to an improved implement or machine for agricultural purposes, particularly designed for the use of gardeners. It is so constructed in its several parts as to adapt it to be used as a harrow or mere pulverizer of the soil, and also as a cultivator, which shall lift the vines and throw the earth around the roots or stocks of the plants.

I will now proceed to describe the machine in detail. A is the central beam, the forward end of which is curved upward and forward to receive the draft. The rear end of the beam A is curved downward to receive a shovel. B are the side beams, the forward ends of which are bolted to the sides of the forward part of the central beam A. The side beams B curve as they pass to the rear, as shown in Fig. 2, and their rear ends are curved downward to receive shovels. C are the handles. the forward ends of which are attached to the sides of the central beam A, and which are held at the proper distance apart by a round, D. The handles C are supported at the proper elevation by braces E, the lower ends of which are attached to the sides of the rear part of the central beam A. F is a plate attached to the central beam A, to the center of which is pivoted the lower end of the shaft G, and in the front and rear parts of which are formed channels to receive the bars H, the outer ends of which are secured to the side beams B, and in the inner edges of which are formed teeth which mesh into the teeth of the gear-wheel I, placed between said toothed bars H and attached to the lower part of the shaft G. By this construction, by turning the shaft G in one or the other direction the side beams B will be drawn toward or pushed from each other, to make the cultivator narrower or wider, as may be required. The shaft G is turned by means of a hand-wheel or plate, J, attached to its upper part. The upper end of the shaft G is supported by and revolves in bearings in the arms at bracket K, which is attached to the handles C or round D. The arms or bracket K also serves as a stop to receive a pin passed through one of the holes in the plate J to hold the side beams B in the position into which they may be adjusted. L are two fingers attached to the opposite sides of the forward part of the central beam A, which are curved outward and forward, as shown in Figs. 1 and 2, and are supported in position by the braces M, the forward ends of which are attached to the outer parts of the said fingers L, and the inner ends of which are attached to the central beam A. N are two fingers attached to the rear parts of the side beams B, a little in front of the shovels attached to the rear ends of said beams. The fingers L and N are designed to run beneath the sweet-potato vines and raise them, allowing the dirt to be thrown beneath them around the roots of the plants, the vines being then allowed to drop back upon the ground. To the sides of the forward beams B are attached two standards, O, which are curved downward, and to which are attached shovels. The shovels P are eight-sided and also oblong. Thus, in harrowing or pulverizing the earth, the longer and narrower points are downward, while, in cultivating, it is desirable that the shovels be secured transversely of the standards, so as to make the lower edge broader and cause the earth to be thrown out laterally. Q Q are cast-steel points, of oblong or diamond-shape. They are bolted to the shovels P, as shown, at the lower edge and on the front side. Hence the earth passing over them and up onto the shovels P has the effect to wear off the upper end of the points, thus rendering them self-sharpening.

I desire it to be understood that I lay no claim to the arrangement for adjusting the side beams laterally at their rear ends; nor do I claim, broadly, the use of reversible shovels.

Having thus described my invention, I claim as new and desire to secure by Letters Patent—

1. The oblong and eight-sided shovels P, adapted to be reversed or changed in position so as to adapt the implement for use as a harrow or cultivator, as specified.

2. The improved agricultural implement formed of the central beam A, hinged adjustable side beams B, and adjusting devices H I G J F, the oblong reversible teeth P provided with self-sharpening teeth Q, the vine-lifters L L and N N, all constructed and arranged as shown and described, to operate as specified.

JOHN S. NOLEN.

Witnesses:
WILLIAM HUFF,
CHARLES H. HANNOLD. (84)